United States Patent
Kim et al.

(10) Patent No.: US 11,296,819 B2
(45) Date of Patent: Apr. 5, 2022

(54) RECEIVER CONTROL APPARATUS AND METHOD FOR SIMULTANEOUS WIRELESS INFORMATION AND POWER TRANSMISSION OPERATING IN DUAL MODE

(71) Applicant: RESEARCH & BUSINESS FOUNDATION SUNGKYUNKWAN UNIVERSITY, Suwon-si (KR)

(72) Inventors: Dong In Kim, Seongnam-si (KR); Jong Jin Park, Suwon-si (KR); Jong Ho Moon, Busan (KR); Kang Yoon Lee, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 7 days.

(21) Appl. No.: 17/060,780

(22) Filed: Oct. 1, 2020

(65) Prior Publication Data

US 2021/0119726 A1    Apr. 22, 2021

(30) Foreign Application Priority Data

Oct. 22, 2019    (KR) .................... 10-2019-0131754

(51) Int. Cl.
*H04L 1/00* (2006.01)
*G06N 3/08* (2006.01)
(Continued)

(52) U.S. Cl.
CPC ............. *H04L 1/0034* (2013.01); *G06N 3/04* (2013.01); *G06N 3/08* (2013.01); *G06N 20/00* (2019.01);
(Continued)

(58) Field of Classification Search
CPC .. G06N 3/04; G06N 3/08; G06N 20/00; H02J 50/001; H02J 50/20; H04B 1/401;
(Continued)

(56) References Cited

U.S. PATENT DOCUMENTS 10,361,596 B1 *   7/2019  Al-Habob ............... H02J 50/50
10,383,126 B2 *   8/2019  Gollakota ............... H02J 50/20
(Continued)

FOREIGN PATENT DOCUMENTS

CN    109286408 A  *  1/2019
CN    110312269 A  *  10/2019
(Continued)

OTHER PUBLICATIONS

L. R. Varshney, "Transporting information and energy simultaneously," Proc. IEEE Int. Symp. Inf. Theory, Toronto, ON, Canada, Jul. 2008, pp. 1612-1616, DOI: 10.1109/ISIT.2008.4595260 (Year: 2008).*

(Continued)

*Primary Examiner* — Eric Nowlin
(74) *Attorney, Agent, or Firm* — NSIP Law

(57) ABSTRACT

A method of performing adaptive mode switching in a transmitter of a dual mode simultaneous wireless information and power transmission (SWIPT) system, incudes receiving received power of a receiver in a channel; comparing the received power with a predetermined threshold value; selecting one of a single tone mode or a multi-tone mode as a single/multi-tone mode based on the comparison result; selecting a modulation index based on the selected single/multi-tone mode and the received power; and transmitting the selected single/multi-tone mode, the selected modulation index, and a duty cycle to the receiver. The duty cycle is determined based on at least one of power consumed for decoding a single tone signal, power consumed for
(Continued)

|  | SINGLE TONE MODE | MULTI-TONE MODE |
|---|---|---|
| RANGE | NARROW AREA | WIDE AREA |
| TRANSMISSION RATE | HIGH SPEED (M-ary MODULATION) | LOW SPEED (PAPR MODULATION) |
| POWER CONSUMPTION | HIGH | LOW |
| PCE | INCREASE IN PCE AT HIGH INPUT POWER | INCREASE IN PCE AT LOW INPUT POWER | decoding a multi-tone signal, and power harvested during the channel by the receiver.

12 Claims, 10 Drawing Sheets

(51) Int. Cl.
| | |
|---|---|
| H04L 27/26 | (2006.01) |
| H04L 1/16 | (2006.01) |
| H04L 5/02 | (2006.01) |
| H04B 7/0404 | (2017.01) |
| H04B 7/06 | (2006.01) |
| H02J 50/00 | (2016.01) |
| H02J 50/20 | (2016.01) |
| G06N 20/00 | (2019.01) |
| G06N 3/04 | (2006.01) |
| H04B 1/401 | (2015.01) |

(52) U.S. Cl.
CPC ............ *H02J 50/001* (2020.01); *H02J 50/20* (2016.02); *H04B 1/401* (2013.01); *H04B 7/0404* (2013.01); *H04B 7/0602* (2013.01); *H04L 1/001* (2013.01); *H04L 1/0003* (2013.01); *H04L 1/0017* (2013.01); *H04L 1/0025* (2013.01); *H04L 1/1607* (2013.01); *H04L 5/023* (2013.01); *H04L 27/2656* (2013.01); *H04L 27/2662* (2013.01); *H04L 27/2671* (2013.01)

(58) Field of Classification Search
CPC ... H04B 7/0404; H04B 7/0602; H04L 1/0003; H04L 1/001; H04L 1/0017; H04L 1/0025; H04L 1/0034; H04L 1/1607; H04L 5/023; H04L 27/2656; H04L 27/2662; H04L 27/2671
See application file for complete search history.

(56) References Cited

U.S. PATENT DOCUMENTS

| | | | | |
|---|---|---|---|---|
| 10,454,320 | B1 * | 10/2019 | Al-Habob | ............... H02J 50/80 |
| 10,505,404 | B1 * | 12/2019 | Al-Habob | ............ H04B 5/0037 |
| 10,541,567 | B2 * | 1/2020 | Kim | ........................ H04W 4/70 |
| 10,819,164 | B2 * | 10/2020 | Kim | ..................... H04L 1/0025 |
| 11,095,169 | B2 * | 8/2021 | Kim | ...................... H02J 50/001 |
| 2011/0218014 | A1 * | 9/2011 | Abu-Qahouq | .......... H02J 50/80 455/522 |
| 2018/0198488 | A1 * | 7/2018 | Tomasi | ................... H02J 50/80 |
| 2019/0089207 | A1 * | 3/2019 | Kim | ....................... H02J 50/27 |
| 2019/0280530 | A1 * | 9/2019 | Navarro | ................. H02J 50/90 |
| 2020/0106308 | A1 * | 4/2020 | Kim | ..................... H04W 52/24 |
| 2021/0119726 | A1 * | 4/2021 | Kim | ....................... G06N 20/00 |

FOREIGN PATENT DOCUMENTS

| | | | | |
|---|---|---|---|---|
| CN | 110351749 | A | * 10/2019 | |
| CN | 110418360 | A | * 11/2019 | |
| CN | 110430148 | A | * 11/2019 | |
| CN | 110493854 | A | * 11/2019 | |
| CN | 106961322 | B | * 3/2020 | |
| CN | 108848558 | B | * 6/2020 | |
| CN | 111491358 | A | * 8/2020 | |
| KR | 101710012 | B1 | * 2/2017 | |
| KR | 10-2019-0033121 | A | 3/2019 | |
| KR | 20190023411 | A | * 3/2019 | |
| KR | 101965665 | B1 | * 4/2019 | ........... H04B 17/336 |
| KR | 101972397 | B1 | * 4/2019 | |
| KR | 20190056998 | A | * 5/2019 | |
| KR | 10-2019-0080728 | A | 7/2019 | |
| KR | 20190079980 | A | * 7/2019 | |
| KR | 20200037620 | A | * 4/2020 | .............. H02J 50/70 |
| KR | 20200060286 | A | * 5/2020 | |
| KR | 102119849 | B1 | * 6/2020 | ............ H02J 50/001 |
| KR | 102141717 | B1 | * 8/2020 | .............. H02J 50/80 |
| KR | 102195862 | B1 | * 12/2020 | |
| KR | 20210047768 | A | * 4/2021 | ............. G06N 20/00 |
| KR | 102278037 | B1 | * 7/2021 | ......... H04L 27/2671 |
| WO | WO-2017041858 | A1 | * 3/2017 | .............. H02J 50/80 |
| WO | WO-2019103261 | A1 | * 5/2019 | ........ H04W 72/0473 |
| WO | WO-2019208843 | A1 | * 10/2019 | ............ H02J 50/001 |
| WO | WO-2019210648 | A1 | * 11/2019 | |

OTHER PUBLICATIONS

Park et al., Dual Mode SWIPT: Waveform Design and Transceiver Architecture with Adaptive Mode Switching Policy, Jun. 3, 2018, 2018 IEEE 87th Vehicular Technology Conference (VTC Spring), DOI: 10.1109/VTCSpring.2018.8417661 (Year: 2018).*

Zhang et al., "MIMO broadcasting for simultaneous wireless information and power transfer,"May 28, 2013, IEEE Trans. Wireless Commun., vol. 12, No. 5, pp. 1989-2001, DOI: 10.1109/TWC.2013. 031813.120224 (Year: 2013).*

Grover et al., Shannon meets Tesla: Wireless information and power transfer, Jun. 13, 2010, Proc. IEEE Int. Symp. Inf. Theory, Austin, Tex., USA, pp. 2363-2367, DOI: 10.1109/ISIT.2010.5513714 (Year: 2010).*

Nasir et al., Relaying protocols for wireless energy harvesting and information processing, Jul. 3, 2013, IEEE Trans. Wireless Commun., vol. 12, No. 7, pp. 3622-3636, DOI: 10.1109/TWC.2013. 062413.122042 (Year: 2013).*

Zhou et al., Wireless information and power transfer: Architecture design and rate-energy tradeoff, Oct. 8, 2013, IEEE Trans. Commun., vol. 61, No. 11, pp. 4754-4767, DOI: 10.1109/TCOMM.2013. 13.120855 (Year: 2013).*

Park, Jong Jin et al., "Mixed-Time Scale Based Adaptive Mode Switching for Dual Mode SWIPT," *2019 IEEE Wireless Power Transfer Conference (WPTC)*, London, United Kingdom, Jun. 17-21, 2019, (6 pages in English).

Korean Notice of Allowance dated Jul. 8, 2021 in counterpart Korean Patent Application No. 10-2019-0131754 (2 pages in Korean).

* cited by examiner

|  | SINGLE TONE MODE | MULTI-TONE MODE |
| --- | --- | --- |
| RANGE | NARROW AREA | WIDE AREA |
| TRANSMISSION RATE | HIGH SPEED (M-ary MODULATION) | LOW SPEED (PAPR MODULATION) |
| POWER CONSUMPTION | HIGH | LOW |
| PCE | INCREASE IN PCE AT HIGH INPUT POWER | INCREASE IN PCE AT LOW INPUT POWER |

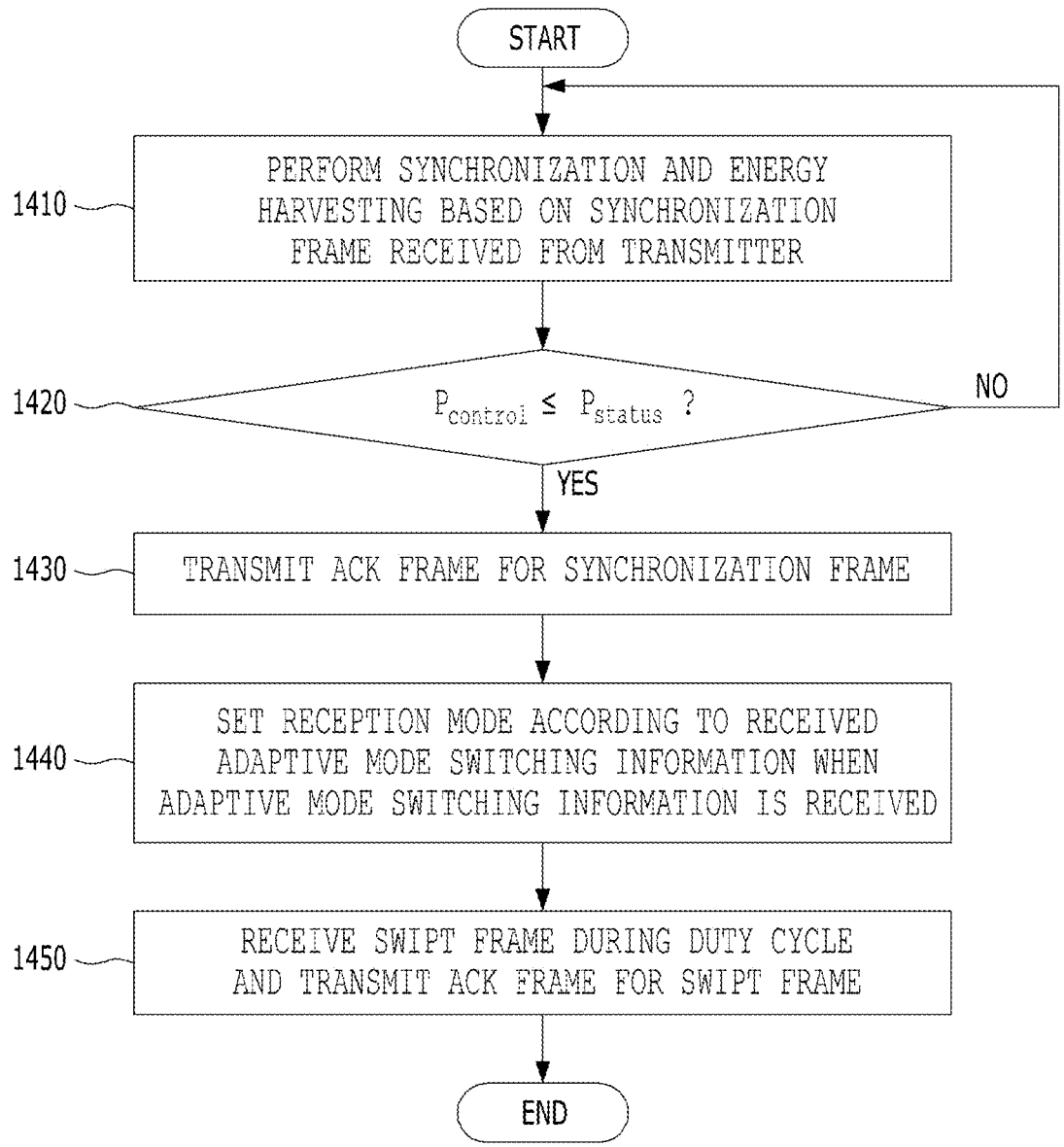

RECEIVER CONTROL APPARATUS AND METHOD FOR SIMULTANEOUS WIRELESS INFORMATION AND POWER TRANSMISSION OPERATING IN DUAL MODE

CROSS-REFERENCE TO RELATED APPLICATIONS

This application claims the benefit under 35 USC 119(a) of Korean Patent Application No. 10-2019-0131754 filed on Oct. 22, 2019, in the Korean Intellectual Property Office, the entire disclosure of which is incorporated herein by reference for all purposes.

BACKGROUND

1. Field

The present disclosure relates to a receiver control apparatus and method for simultaneous wireless information and power transmission (SWIPT) operating in a dual mode.

DESCRIPTION OF THE RELATED ART

Recently, a simultaneous wireless information and power transmission (SWIPT) technique has been studied. The SWIPT technique is effective in supplying power to an apparatus having a low power consumption, such as Internet-of-Things (IoT), a wearable device, and a biosensor. The conventional SWIPT technology of simultaneously wirelessly transmitting information and energy includes a time-switching (TS) scheme of dividing a period of time to sequentially receive the information and the energy, and a power-splitting (PS) scheme of dividing power of a received signal to transmit a part of signals to a circuit harvesting the energy and provide a part of signals to the circuit receiving the information.

When using a conventional SWIPT technology operating in the dual mode, the receiver continuously monitors battery status, received signal power, and transmission rate requirement (QoS: Quality of Service), and then selects energy harvesting efficiency, a data transmission rate, and the like according to the battery status, the received signal power, and the transmission rate requirement. Thus, the receiver inherently requires a high-performance micro-controller unit (MCU). Therefore, it may be difficult to apply the dual mode SWIPT system to a receiver operated at an extremely low power, such as an IoT sensor.

In addition, the dual mode SWIPT system continuously switches the communication mode between the transmitter and the receiver based on its environment, and thus synchronization between the transmitter and the receiver is important. However, common synchronization schemes, such as Wifi and Bluetooth, do not consider simultaneous transmission of the energy and the information. Recent studies have focused on a synchronization method between the transmitter and the receiver of the dual mode SWIPT system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of performing adaptive mode switching in a transmitter of a dual mode simultaneous wireless information and power transmission (SWIPT) system, incudes receiving received power of a receiver in a channel; comparing the received power with a predetermined threshold value; selecting one of a single tone mode or a multi-tone mode as a single/multi-tone mode based on the comparison result; selecting a modulation index based on the selected single/multi-tone mode and the received power; and transmitting the selected single/multi-tone mode, the selected modulation index, and a duty cycle to the receiver. The duty cycle is determined based on at least one of power consumed for decoding a single tone signal, power consumed for decoding a multi-tone signal, and power harvested during the channel by the receiver.

The predetermined threshold value may be determined after performing machine learning based on at least one of a plurality of single/multi-tone modes selected during a predetermined time, the modulation index, and the duty cycle, and the power received by the receiver during the predetermined time.

In another general aspect, a receiver control method performed in a transmitter of a dual mode simultaneous wireless information and power transmission (SWIPT) system, includes: transmitting one or more synchronization frames to a first receiver; receiving an ACK frame for at least one of the synchronization frames from the first receiver in a control frame; performing adaptive mode switching based on received power information of the first receiver included in the ACK frame; generating mode information based on the adaptive mode switching and an adaptive mode switching frame, including address information of the first receiver, and transmitting the generated mode information and adaptive mode switching frame to the first receiver; and transmitting a SWIPT frame to the first receiver when an ACK frame for the adaptive mode switching frame is received from the first receiver. The ACK frame for the synchronization frame and the ACK frame for the adaptive mode switching frame include the received power information of the first receiver.

The SWIPT frame may include an energy harvesting frame (EH frame) that is not modulated and an information transmission frame (ID frame) that is modulated. The receiver control method may further include receiving only the energy harvesting frame by another receiver while the transmitter transmits the control frame and the SWIPT frame to the first receiver.

The transmitting of one or more synchronization frames to the first receiver may be based on a multi-tone mode.

When the ACK frame for the synchronization frame is not received from the first receiver in the control frame, the receiver control method may further include transmitting a frame for wireless energy transmission instead of the SWIPT frame.

The transmitter may be configured to control a plurality of receivers including the first receiver based on a multiple division method of at least one of a time division multiplexing (TDM) method and a dynamic-TDM (D-TDM) method.

When each of the transmitter and the first receiver includes a multi-antenna, the transmitting of the SWIPT frame to the first receiver may receive the received power information of the first receiver from a first antenna of the transmitter and transmitting of the SWIPT frame to the first receiver by using a second antenna of the transmitter.

In another general aspect, a transmitter of a dual mode simultaneous wireless information and power transmission (SWIPT) system performing adaptive mode switching, includes: a single/multi-tone generator configured to generate and transmit at least one of a single tone and a multi-tone to a receiver; and an adaptive mode switch configured to extract information regarding received power of the receiver based on a backscatter signal received from the receiver, determine at least one of a single/multi-tone mode, a modulation index, and a duty cycle based on the extracted information regarding the received power, and output the determination result to the receiver for transmission.

The transmitter may further include a machine learning processor configured to perform machine learning based on at least one of a plurality of single/multi-tone modes selected during a predetermined time, the modulation index, and the duty cycle, and the power received by the receiver during the predetermined time, and generate a predetermined threshold value which is the basis of determination on the single/multi-tone mode.

In another general aspect, a method of performing adaptive mode switching in a receiver of a dual mode simultaneous wireless information and power transmission (SWIPT) system, includes: performing synchronization based on a synchronization frame received from a transmitter, and harvesting power; determining whether the harvested power is equal to or greater than a threshold value; transmitting an ACK frame from the synchronization frame based on the determining result; setting a reception mode according to a received adaptive mode switching information from the transmitter; and receiving a SWIPT frame from the transmitter during a duty cycle and transmitting an ACK frame for the SWIPT frame.

In another general aspect, a receiver of a dual mode simultaneous wireless information and power transmission (SWIPT) system performing adaptive mode switching, includes: an energy harvester configured to harvest energy from a reception signal; a single tone information receiver configured to extract and decode a predetermined modulation signal from the reception signal; a multi-tone peak-to-average power ratio (PAPR) information receiver configured to extract and decode a predetermined PAPR signal from the reception signal; a power manager configured to monitor received power information of the receiver and perform adaptive mode switching based on at least one of a single/multi-tone mode received from a transmitter, a modulation index, and a duty cycle; and a backscatter signal transmitter configured to output monitoring information to the transmitter for transmission.

The monitoring information may be used for machine learning in the transmitter, and the backscatter signal transmitter may be configured to transmit information by reflecting at least one of a carrier emitter or an ambient signal.

Other features and aspects will be apparent from the following detailed description, the drawings, and the claims.

BRIEF DESCRIPTION OF THE DRAWINGS

FIG. 14 is a flowchart explaining a method of performing adaptive mode switching in a receiver of a dual mode SWIPT system, according to an embodiment of the present disclosure.

DETAILED DESCRIPTION

Figures 1, 2:
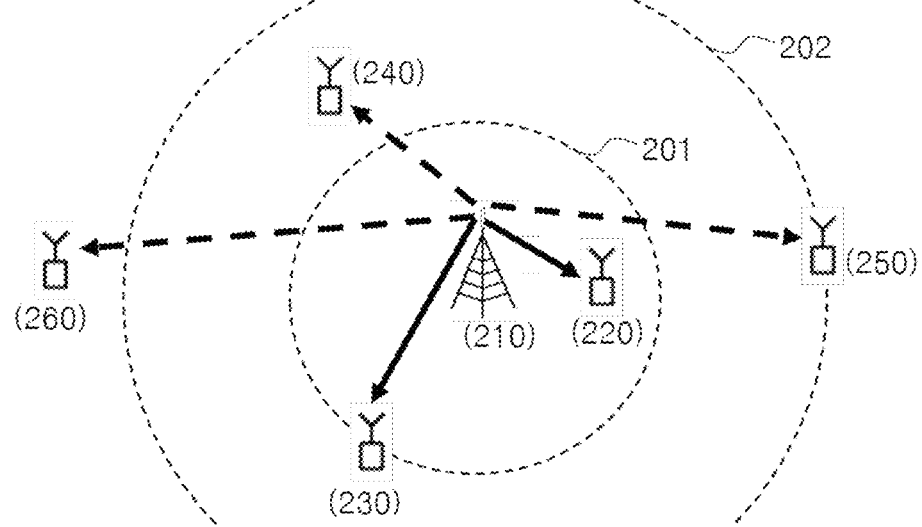
FIG. 1 is a view explaining a conventional single tone mode SWIPT and a conventional multi-tone mode SWIPT.
FIG. 2 is a view illustrating an environment in which a plurality of receivers exist in a service area of a transmitter capable of performing dual mode SWIPT.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

An object to be achieved by the present disclosure is to provide an adaptive mode switching method for a dual mode SWIPT capable of performing most operations for switching an adaptive mode by a transmitter in the dual mode SWIPT system to reduce complexity and power consumption of a receiver, and an apparatus for the same.

Another object to be achieved by the present disclosure is to provide a synchronization method between the transmitter and the receiver of the dual mode SWIPT system.

The objects of the present disclosure are not limited to the aforementioned object(s), and other object(s), which are not mentioned above, will be apparent to a person having ordinary skill in the art from the following description.

FIG. 1 is a view explaining a conventional single tone mode SWIPT and a conventional multi-tone mode SWIPT.

Referring to FIG. 1, a single tone mode of the SWIPT uses a M-ary modulation scheme, and thus has a relatively high transmission rate and shows high RF power conversion efficiency (PCE) at a high radio frequency (RF) received power (0 dBm or more) due to nonlinearity of its rectifier. However, in the single tone mode of the SWIPT, a receiver has a narrow service area and high power consumption compared with the multi-tone mode of the SWIPT.

In contrary, the multi-tone mode of the SWIPT uses a peak-to-average power ratio (PAPR) modulation scheme, and thus has a low transmission rate, but does not require channel estimation, The multi-tone mode of the SWIPT utilizes an envelope detector that does not consume a large amount of power, such that power consumption of the receiver may be reduced. Further, the multi-tone mode has a wide service area and may show high PCE at a low RF received power (0 dBm or less) due to nonlinearity of its rectifier.

Such a single tone mode and multi-tone mode of the SWIPT have both advantages and disadvantages. Therefore, a dual mode SWIPT system is proposed in order to effectively use the two techniques by adaptively switching the mode according to a communication environment.

FIG. 2 is a view illustrating an environment in which a plurality of receivers exist in a service area of a transmitter capable of performing dual mode SWIPT.

The dual mode SWIPT system may include a transmitter 210 capable of switching a mode in a dual mode, and a plurality of receivers 220, 230, 240, 250, and 260.

The transmitter 210 may select a communication mode according to a reception environment of each of the plurality of receivers 220, 230, 240, 250, and 260 to transmit a signal generated in a single tone or transmit a signal generated in a multi-tone.

Referring to FIG. 2, since the first receiver 220 is located in a service area 201 of a single tone SWIPT mode, the transmitter 210 may transmit high speed data to the first receiver 220. However, the second receiver 230 is located at a boundary of the service area 201 of the single tone SWIPT mode, and the transmitter 210 switches a communication mode for the second receiver 230 to a multi-tone SWIPT mode.

The third receiver 240 is located in a service area 202 of the multi-tone SWIPT mode, and the transmitter 210 switches the communication mode to the multi-tone SWIPT mode based on the channel environment of the third receiver 240. In a case of the fourth receiver 250 located at a boundary of the service area 202 of the multi-tone SWIPT mode, the transmitter 210 may transmit power to the fourth receiver 250 in the multi-tone SWIPT mode with an increased number of tones Q. However, the fifth receiver 260, which is out of the service area 202 of the multi-tone SWIPT mode, may be operated by wireless power transfer (WPT) rather than SWIPT.

In other words, the receiver of the dual mode SWIPT system continuously monitors a battery status, received signal power, and a transmission rate requirement (QoS: Quality of Service), and selects the communication mode and a modulation index according to the monitored information. To this end, the receiver requires a high-performance micro-controller unit (MCU) requiring great power consumption, and thus it is difficult to apply the receiver to an environment operated at extremely low power, such as an IoT sensor.

Further, since the transmitter/receiver of the dual mode SWIPT system continuously switches the communication mode based on the channel environment, synchronization between the transmitter and the receiver is important. However, common synchronization schemes, such as Wifi and Bluetooth, do not consider simultaneous transmission of the energy and the information, such that it is difficult to apply the synchronization scheme to the dual mode SWIPT system.

Figure 3:
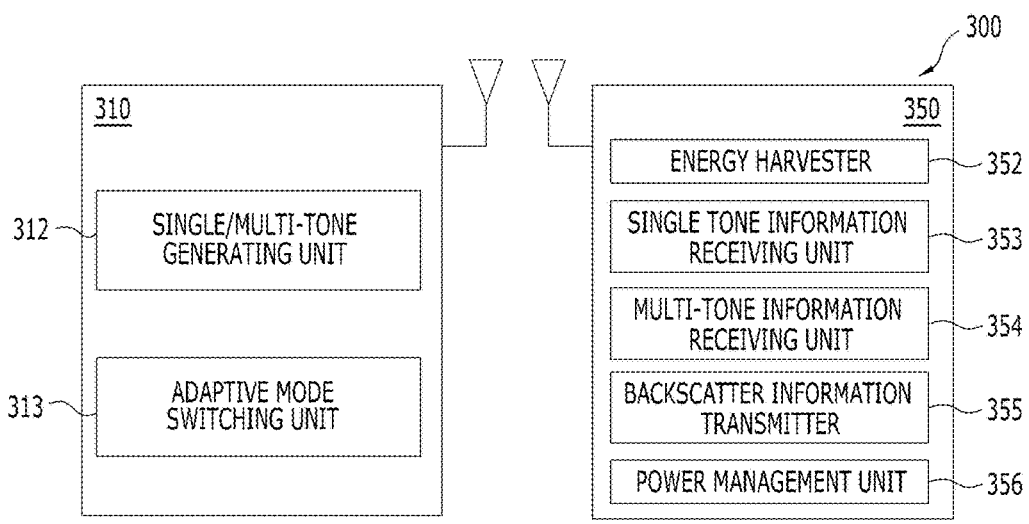
FIG. 3 is a view illustrating structures of a transmitter and a receiver, according to an embodiment of the present disclosure.

FIG. 3 is a view illustrating structures of a transmitter and a receiver, according to an embodiment of the present disclosure.

A transmitter 310 of a dual mode SWIPT system 300, according to an embodiment, may include a single/multi-tone generating unit 312 and an adaptive mode switching unit 313.

The single/multi-tone generating unit 312 may generate at least one of a single tone signal and a multi-tone signal in order to transmit a single tone signal and/or a multi-tone signal to the receiver.

The adaptive mode switching unit 313 may extract information regarding a received power of a receiver 350 based on a backscatter signal received from the receiver 350. The adaptive mode switching unit 313 may determine at least one of a single/multi-tone mode, a modulation index, and a duty cycle based on information regarding the extracted received power, and output the determination result to the receiver 350 for transmission. An adaptive mode switching method performed by the adaptive mode switching unit 313 will be further described in detail with reference to FIG. 5.

The receiver 350 of the dual mode SWIPT system 300 may include an energy harvester 352, a single tone information receiving unit 353, a multi-tone PAPR information receiving unit 354, a backscatter information transmitter 355, and a power management unit 356.

The energy harvester 352 may harvest energy from a reception signal.

The single tone information receiving unit 353 may extract a predetermined modulation signal from the reception signal and decode the extracted modulation signal.

The multi-tone PAPR information receiving unit 354 may extract a peak-to-average power ratio (PAPR) signal from the reception signal and decode the extracted PAPR signal.

The power management unit 356 may monitor information regarding the received power of the receiver 350 and perform adaptive mode switching based on at least one of a single/multi-tone mode received from the transmitter 310, a modulation index, and a duty cycle.

The backscatter information transmitter 355 may output monitoring information on the received power of the receiver 350 to the transmitter 310 for transmission. In this case, the backscatter information transmitter 355 may output the monitoring information every time and for each block, and the output monitoring information may be based on machine learning.

The backscatter signal transmitter 355, according to an embodiment, may transmit the information by reflecting at least one of a carrier emitter or an ambient signal, such that the backscatter signal transmitter 355 consumes extremely low power, resulting in suitability for implementing a low-power receiver.

Further, the receiver 350, according to an embodiment, supports a duty cycle operation, and may harvest energy and receive and demodulate information according to an adaptive mode switching algorithm at an optimum ratio.

Figure 4:
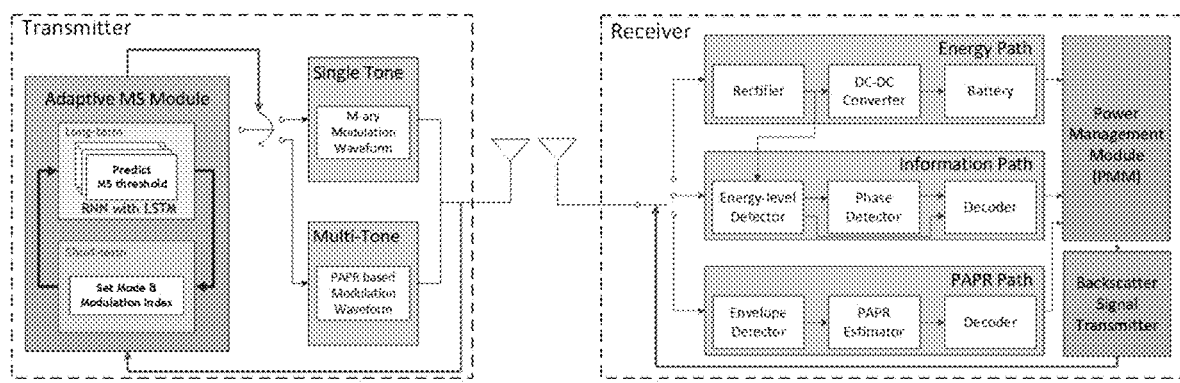
FIG. 4 is a view illustrating structures of a transmitter and a receiver, according to another embodiment of the present disclosure.

FIG. 4 is a view illustrating structures of a transmitter and a receiver, according to another embodiment of the present disclosure.

The transmitter of the dual mode SWIPT system in FIG. 4 may include a single tone generating unit (illustrated as "single tone" in FIG. 4) performing M-ary modulation, a multi-ton generating unit (illustrated as "multi-tone" in FIG. 4) performing PAPR modulation, and an adaptive mode switching unit (adaptive MS module). The adaptive mode switching unit (adaptive MS module) may include a short-term adaptive mode switching unit (illustrated as "short-term" in FIG. 4) performing adaptive mode switching every time and for each block and a long-term adaptive mode switching unit (illustrated as "long-term" in FIG. 4) performing machine learning.

Meanwhile, the single tone generating unit and the multi-tone generating unit of the transmitter in FIG. 4 may be switched by a signal output from the adaptive mode switching unit (adaptive MS module). Therefore, a combination of the single tone generating unit and the multi-tone generating unit in FIG. 4 may correspond to the single/multi-tone generating unit 312 in FIG. 3.

Meanwhile, the receiver may include an energy harvester (illustrated as "energy path" in FIG. 4), a single tone information receiving unit (illustrated as "information path" in FIG. 4), a multi-tone PAPR information receiving unit (illustrated as "PAPR path" in FIG. 4), a backscatter information transmitter (backscatter signal transmitter), and a power management unit (power management module; PMM).

Figure 5:
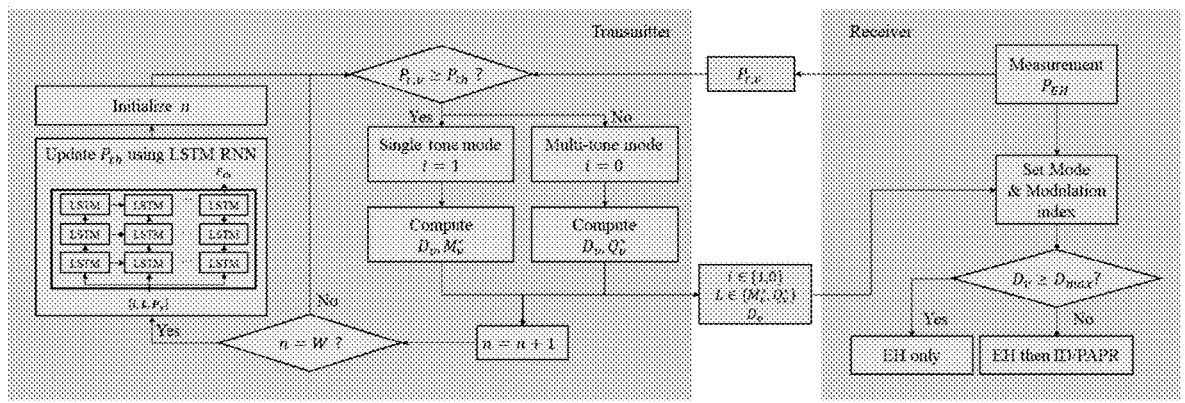
FIG. 5 is a view explaining an adaptive mode switching method for a dual mode SWIPT system based on machine learning, according to an embodiment of the present disclosure.

FIG. 5 is a view explaining an adaptive mode switching method for a dual mode SWIPT system based on machine learning, according to an embodiment of the present disclosure.

The receiver, according to an embodiment, monitors power $P_{r,v}$ received from a v-th time block by an energy harvester through a power management unit, and transmits the monitored received power to the transmitter through the backscatter signal transmitter.

Thereafter, the adaptive mode switching unit of the transmitter compares the received power $P_{r,v}$ of the receiver with a mode switching threshold value $P_{th}$, and selects a single/multi-tone mode (when i∈{1, 0}, 1 denotes the single tone mode, and 0 denotes the multi-tone mode) to determine an optimized modulation index (when L∈{M, Q}, M denotes a modulation index, and Q denotes the number of tones in the multi-tone mode). A duty cycle ratio $D_v$ denotes a cycle for transmitting a SWIPT frame, and is determined from a condition of the following Equation 1 so that a power residual amount of a battery of the receiver is greater than power consumption of the receiver in one time block in order to perform self-powering.

$$E_{EH} \geq iE_{C,s} + (1-i)E_{C,m} \qquad \text{[Equation 1]}$$

$$D_v \geq \frac{1}{P_{EH}}\{iP_{C,s} + (1-i)P_{C,m}\}$$

$E_{C,s}$ and $E_{C,m}$ ($P_{C,s}$ and $P_{C,m}$) each denote energy (power) consumed in decoding of the single/multi-tone signal, and $E_{EH}(P_{EH})$ denotes harvested energy (power) in the v-th time block in a duty cycle operation by the receiver. The determined mode switching information i, L, and $D_v$ is transmitted to the receiver through a control signal. Further, the transmitter stores the determined mode switching information i, L, and $D_v$ and the received power $P_{r,v}$ of the receiver in order to update the mode switching threshold value $P_{th}$ by utilizing recurrent neural network (RNN).

Figure 6:
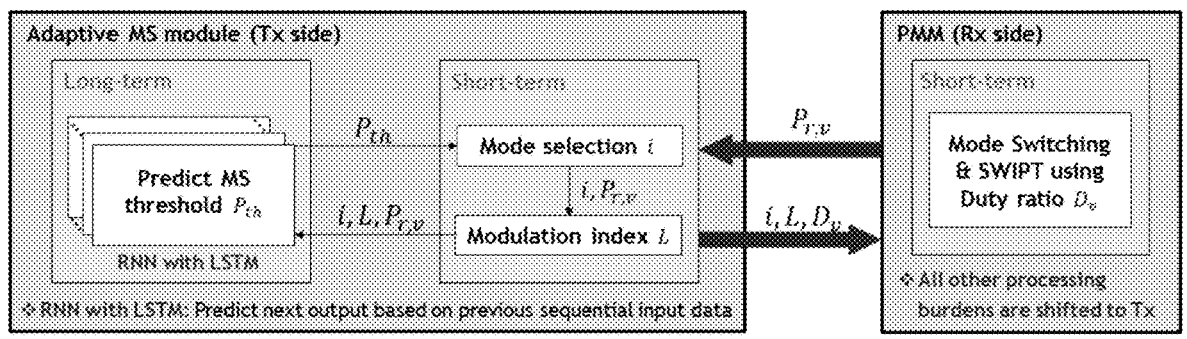
FIG. 6 is a view explaining a long-term/short-term adaptive mode switching method of the adaptive mode switching method for a SWIPT system based on machine learning, according to an embodiment of the present disclosure.

FIG. 6 is a view explaining a long-term/short-term adaptive mode switching method of the adaptive mode switching method for a SWIPT system based on machine learning, according to an embodiment of the present disclosure.

In the adaptive mode switching method of the dual mode SWIPT system, according to the embodiment, a process of determining the mode switching information i, L, and $D_v$ is defined as short-term adaptive mode switching (MS) based on Equation 1 for each time block.

In this case, in the adaptive mode switching method, according to an embodiment, not only the short-term adaptive mode switching is performed, but also long-term adaptive mode switching (MS) is performed through a machine learning processor.

Specifically, the transmitter repeatedly performs short-term adaptive MS of each time block by the predetermined number of time blocks Wand deep RNN by inputting the mode switching information of each time block to the machine learning processor, and thus the mode switching threshold value $P_{th}$ may be updated.

Here, the deep RNN is a deep neural network having a structure in which multiple long short term memories (LSTMs) are connected, and is a machine learning technique for learning given data changed together over time. The actual communication environment has a high temporal correlation depending on a time. Therefore, when the long-term adaptive MS is performed during W time blocks by utilizing the deep RNN, an optimized mode switching threshold value $P_{th}$ may be obtained.

Referring to FIG. 6, most operations for performing the mode switching is performed in the adaptive mode switching unit of the transmitter, and the power management unit of the receiver simply manually performs the mode switching according to the control signal for each time block. Thus, the dual mode SWIPT system, according to an embodiment, may perform the optimized mode switching while minimizing power consumption of the receiver.

Figure 7:
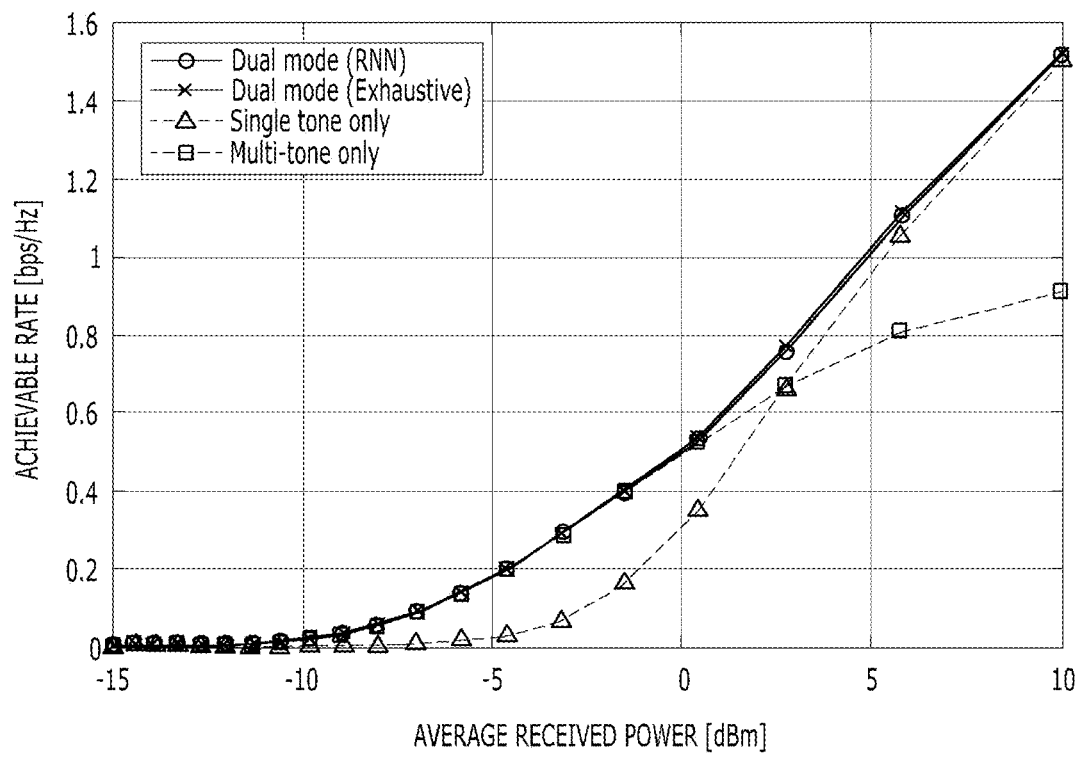
FIG. 7 is a view illustrating test results of an adaptive mode switching SWIPT system based on machine learning, according to an embodiment of the present disclosure.

FIG. 7 is a view illustrating test results of an adaptive mode switching SWIPT system based on machine learning, according to an embodiment of the present disclosure.

Referring to FIG. 7, it may be confirmed that the dual mode SWIPT system based on machine learning according to an embodiment has an excellent performance by comparing an existing technique of only utilizing the single tone (single tone only) with a technique of only using the multi-tone (multi-tone only). Further, a result (dual mode-RNN) of the dual mode switching method based on machine learning according to an embodiment of the present disclosure coincides with an ideal result (dual mode-exhaustive) obtained by searching for all cases.

Therefore, it may be confirmed in FIG. 7 that in the dual mode switching method based on machine learning according to an embodiment, the optimized mode switching is effectively performed.

Figure 8:
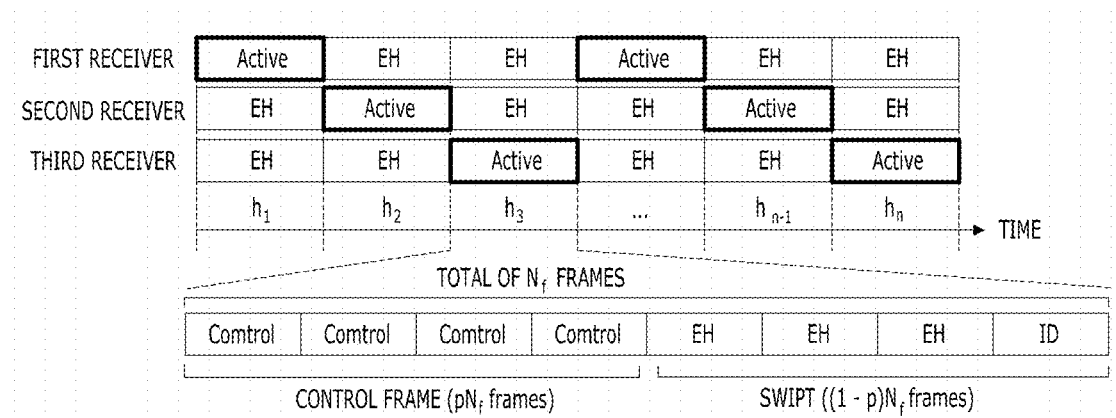
FIG. 8 is a view explaining a configuration of frame transmitted when a transmitter of an adaptive mode switching SWIPT system, according to an embodiment of the present disclosure, controls a plurality of receivers.

FIG. 8 is a view explaining a configuration of frame transmitted when a transmitter of an adaptive mode switching SWIPT system, according to an embodiment of the present disclosure, controls a plurality of receivers.

In a case of the single/multi-tone mode switching method, according to an embodiment, the transmitter received monitoring information from the receiver determines the overall mode switching operation of the SWIPT system. Therefore, it is very important to synchronize between the transmitter and the receiver and transmit the control signal. Further, since the receiver is operated in a manner to maintain a sleep mode for most of the time in a low-power IoT environment in order to reduce power consumption, it needs to supply power required for receiving the control signal for self-powering. To this end, the dual mode SWIPT system, according to an embodiment of the present disclosure may simultaneously perform wake-up and synchronization of the receiver.

On the other hand, a location of the receiver does not suddenly change in most low-power IoT environment, and thus a slow fading in which a plurality of data frames exists in one time block may be assumed. Therefore, it is presumed in the following description that one time block is divided into $N_f$ frames, and all the frames undergo same frequency-flat fading in the time block.

Further, the dual mode SWIPT system, according to an embodiment, uses a time-division multiplexing (TDM) method of alternatively assigned each time block to the receiver as time passes in order to support a plurality of receivers by one transmitter. In this case, since only the transmitter/receiver performs a protocol for SWIPT signal transmission/reception every time and for each time block, the remaining receivers may utilize all of the received signal in power harvesting while performing the protocol.

On the other hand, in a dual mode SWIPT system, according to another embodiment, a dynamic-time division multiplexing (D-TDM) method of flexibly assigning a resource to the receiver depending on a transmission rate requirement (QoS) of the receiver may be used, instead of the TDM method.

FIG. 8 is a view illustrating an example in which one transmitter utilizes the TDM method for supporting first to third receivers. Referring to a frame structure capable of receiving a frame by the first receiver in FIG. 8 as time passes, $h_1$ is a time block of the first receiver being activated, and thus a control frame and a SWIPT frame may be received in $h_1$, but only energy harvesting frame is received in $h_2$ and $h_3$. Hereinafter, a situation in which one receiver is operated in one time block for convenience of description.

Referring to FIG. 8, a total of $N_f$ frames may be divided into $\rho N_f$ control frames and $(1-\rho)N_f$ SWIPT frames. Here, $\rho$ is between 0 and 1. If $\rho$ becomes greater, more frames are assigned for control of the receiver, such that communication has a high stability can be performed. However, the number of SWIPT frames decreases, and the transmission rate is reduced. Accordingly, $\rho$ may be adjusted due to stability of the synchronization and the transmission rate which are required by the system.

The dual mode SWIPT system allows the receiver to wake from the sleep mode through wireless energy transmission, and performs synchronization between the transmitter/receiver. After performing the synchronization between the transmitter and the receiver, the dual mode SWIPT system performs mode information exchange for the adaptive mode switching of the transmitter/receiver using the control frame.

Figure 9A:
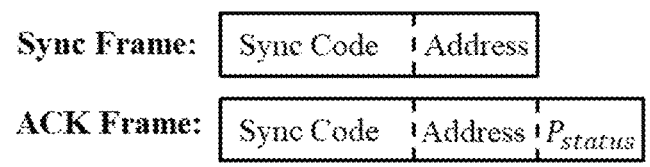
FIGS. 9A and 9B are views explaining a synchronization method between the transmitter and the receiver of an adaptive mode switching SWIPT system, according to an embodiment of the present disclosure.
Figure 9B:
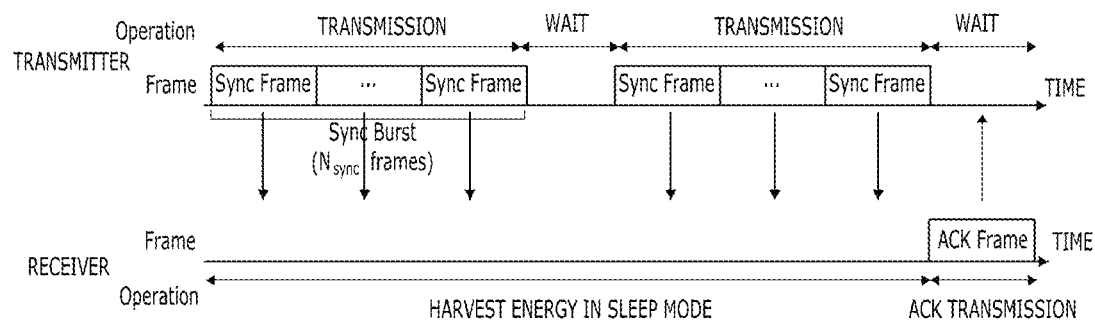

FIGS. 9A and 9B are views explaining a synchronization method between the transmitter and the receiver of an adaptive mode switching SWIPT system, according to an embodiment of the present disclosure.

Referring to FIG. 9A, a synchronization frame (sync frame) transmitted from the transmitter is constituted by a synchronization code (sync code) and an address for a receiving node, and uses a predetermined synchronization code for synchronization of time and symbols between the transmitter and the receiver. The SWIPT system, according to an embodiment of the present disclosure, performs frame synchronization by utilizing Baker code sequence and performs symbol synchronization through Manchester coding, but a frame/symbol synchronization technique is not limited to this.

On the other hand, referring to FIG. 9B, the transmitter transmits $N_{sync}$ synchronization frames into burst in order to enhance energy harvesting efficiency of the receiver and secure a sufficient length of a synchronization signal. In this case, the transmitter, according to an embodiment, utilizes the multi-tone mode to transmit the synchronization frame, such that power consumption for demodulating the synchronization signal of the receiver may be reduced. The transmitter waits for the ACK frame to be received from the receiver for a predetermined time. When the ACK frame is not received within the time, the transmitter repeatedly transmits the synchronization frame into burst again.

If the number of synchronization frames repeatedly transmitted into burst exceeds the total number of control frames $\rho N_f$, the transmitter transmits an energy harvesting frame only instead of the remaining $(1-\rho)N_f$ SWIPT frames. In this case, since an information frame is not included in a plurality of frames transmitted by the transmitter, the transmitter may be operated by wireless power transfer (WPT) rather than the SWIPT.

On the other hand, the receiver receives the synchronization frame into burst and secures a sufficient power required for the adaptive mode switching at the same time while performing synchronization between the transmitter and the receiver. Further, the receiver utilizes a backscatter communication method to store monitoring information on the received power in a $P_{status}$ field of the ACK frame and transmits the stored monitoring information. Accordingly, the ACK frame is a structure in which the $P_{status}$ field is added to the sync frame, and the transmitter grasps the received power of the receiver from the $P_{status}$ field to perform the adaptive mode switching.

Figure 10A:
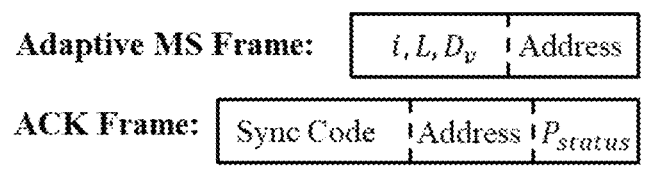
FIGS. 10A and 10B are views explaining a method of performing adaptive mode switching SWIPT by a transmitter/receiver, according to an embodiment of the present disclosure.
Figure 10B:
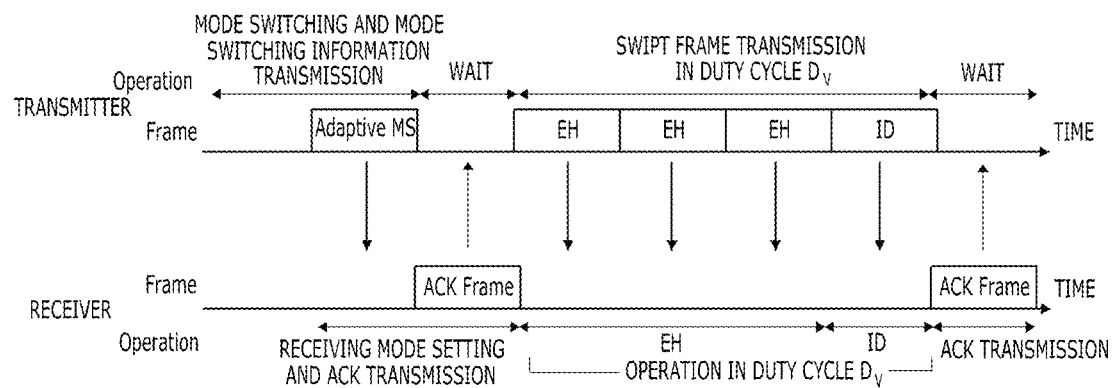

FIGS. 10A and 10B are views explaining a method of performing adaptive mode switching SWIPT by a transmitter/receiver, according to an embodiment of the present disclosure.

The transmitter performs the adaptive mode switching after completing the synchronization, and transmits information i, L, and $D_v$ regarding the adaptive mode switching through an adaptive mode switching frame (adaptive MS frame). Thereafter, the receiver performs SWIPT based on the received information i, L, and $D_v$ regarding the adaptive mode switching.

Referring to FIG. 10A, the adaptive mode switching frame (adaptive MS frame) is constituted by the information i, L, and $D_v$ regarding the adaptive mode switching and an address for the receiver that receives the information i, L, and $D_v$. Further, the ACK frame of the adaptive mode switching frame may be added to the $P_{status}$ field storing the received power in the same manner as the ACK frame in FIG. 9A. The transmitter may perform the long-term adaptive mode switching based on machine learning through the added $P_{status}$ field.

Referring to FIG. 10B, the transmitter performs the short-term adaptive mode switching and transmits information regarding the adaptive mode switching to the receiver through the adaptive mode switching frame. The receiver sets the mode of a reception mode of the receiver, a modulation index, and a duty cycle and transmits the ACK frame to the transmitter. Thereafter, the receiver transmits and receives the SWIPT frame based on a duty cycle operation during $(1-\rho)N_f$ frames.

In this case, the energy harvesting frame (EH frame) transmits a multi-tone utilizing the single tone or whole tones that is not modulated, and an information transmission frame (ID frame) uses the M-ary modulation or PAPR modulation depending on the single/multi-tone mode. Here, the transmitter, according to an embodiment, may transmit the energy harvesting frame and the information transmission frame to the receiver through power allocation between the frames with a transmission power adjusted in different ways according to the frame. In this case, it is possible for the transmitter to efficiently transmit the SWIPT signal in terms of energy.

On the other hand, in the dual mode SWIPT system based on TDM scheme according to an embodiment, handshaking process is performed in the transmitter/receiver only designated by $\rho N_f$ control frames, and thus it is not necessarily to transmit the address of the receiver through $(1-\rho)N_f$ SWIPT frames.

Figure 11:
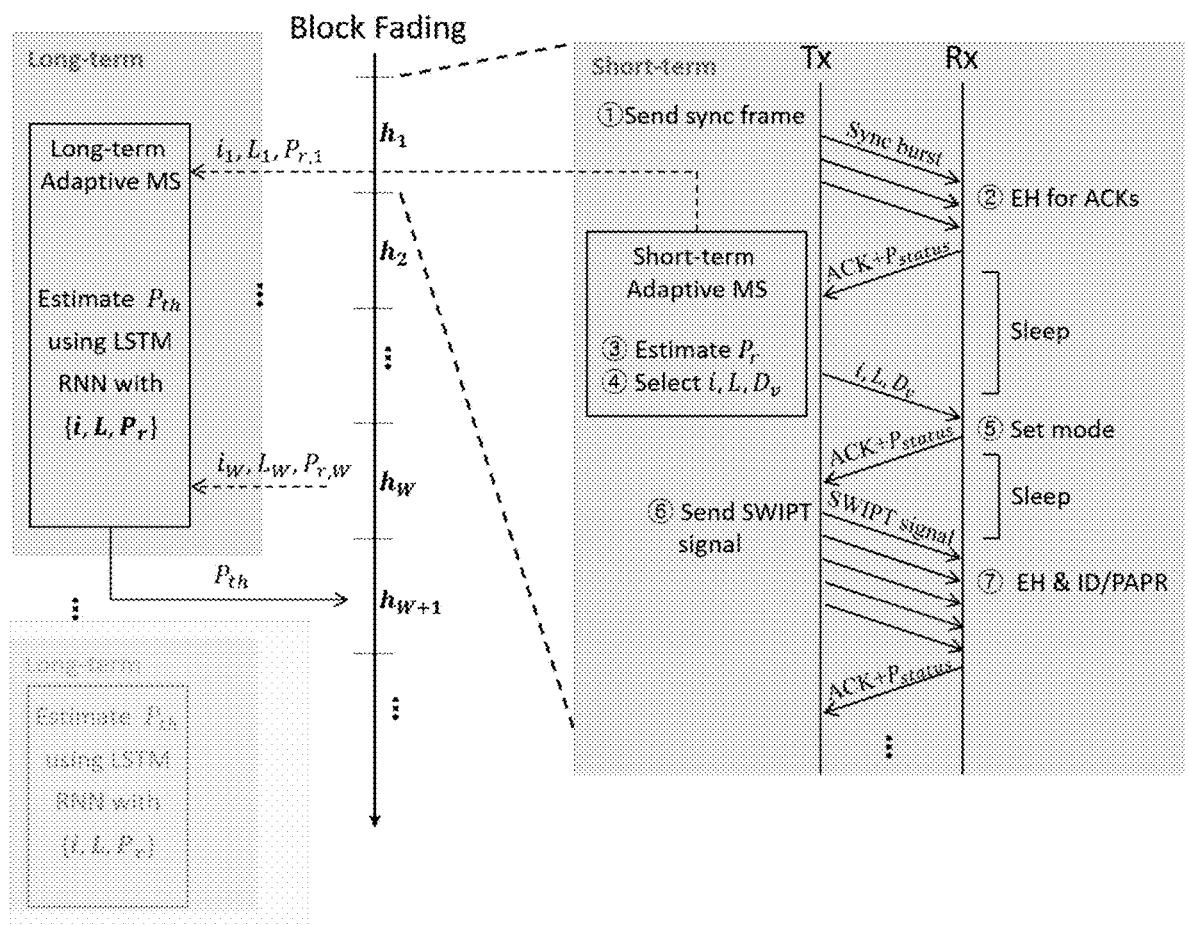
FIG. 11 is a flowchart explaining an adaptive mode switching method for dual mode SWIPT, according to an embodiment of the present disclosure.

FIG. 11 is a flowchart explaining an adaptive mode switching method for dual mode SWIPT, according to an embodiment of the present disclosure.

Referring to the short-term block in FIG. 11, the short-term adaptive mode switching is performed during the h-th time block, and the information i, L, and $D_v$ regarding the adaptive mode switching may be provided to the long-term adaptive mode switching unit (long-term adaptive MS) for long-term adaptive mode switching. Thereafter, the long-term adaptive mode switching unit may receive the information i, L, and $D_v$ regarding the adaptive mode switching from the $h_1$-th time block to $h_W$-th time block, and update a predetermined threshold value $P_{th}$ required for the short-term adaptive mode switching through LSTM RNN. The updated predetermined threshold value $P_{th}$ may be output from a $h_{W+1}$-th time block.

Meanwhile, in a case of the short-term adaptive mode switching, when a transmitter TX transmits a synchronization frame (sync frame) burst to a receiver RX, and then an ACK frame including the $P_{status}$ field in which a received power of the receiver RX is stored is received from the receiver RX, the transmitter TX performs the short-term adaptive mode switching based on a $P_{status}$ field value. Thereafter, the receiver RX, which receives the information i, L, and $D_v$ regarding the short-term adaptive mode switching from the transmitter TX, sets the mode according to the information i, L, and $D_v$, and transmits the ACK frame including the $P_{status}$ field to the transmitter TX again.

The transmitter TX transmits the SWIPT frame to the receiver RX after receiving the ACK frame, and the receiver RX performs energy harvesting and information decoding based on the energy harvesting frame and the information transmission frame in the received SWIPT frame.

Figure 12:
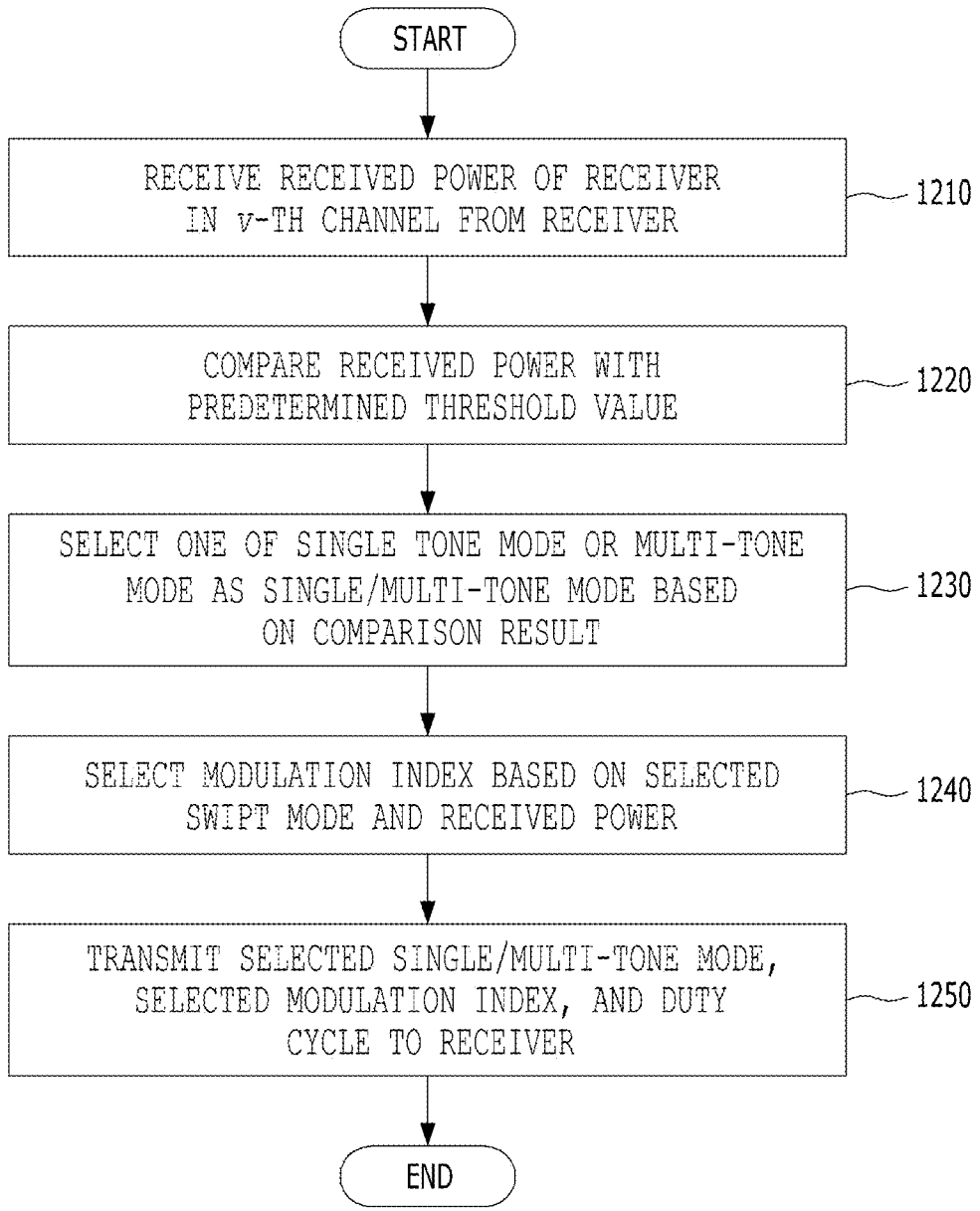
FIG. 12 is a flowchart explaining a method of performing adaptive mode switching in a transmitter of a dual mode SWIPT system, according to an embodiment of the present disclosure.

FIG. 12 is a flowchart explaining a method of performing adaptive mode switching in a transmitter of a dual mode SWIPT system, according to an embodiment of the present disclosure.

In Step 1210, a received power $P_{r,v}$ of the receiver may be received in a v-th channel by the receiver.

In Step 1220, the received power $P_{r,v}$ and a predetermined threshold value $P_{th}$ may be compared with each other.

In Step 1230, one of a single tone mode or a multi-tone mode may be selected as a single/multi-tone mode i based on the comparison result.

In Step 1240, a modulation index L may be selected based on the selected single/multi-tone mode i and the received power $P_{r,v}$.

In Step 1250, the selected single/multi-tone mode i, the selected modulation index L, and the duty cycle $D_v$ may be transmitted to the receiver. Here, the duty cycle $D_v$ may be determined based on at least one of power consumed for decoding a single tone signal, power consumed for decoding a multi-tone signal, and power harvested during the v-th channel by the receiver.

Further, the predetermined threshold value $P_{th}$ may be determined after performing machine learning by using at least one of a plurality of single/multi-tone modes selected during a predetermined time, the modulation index, and the duty cycles, and the power received by the receiver during a predetermined time.

Figure 13:
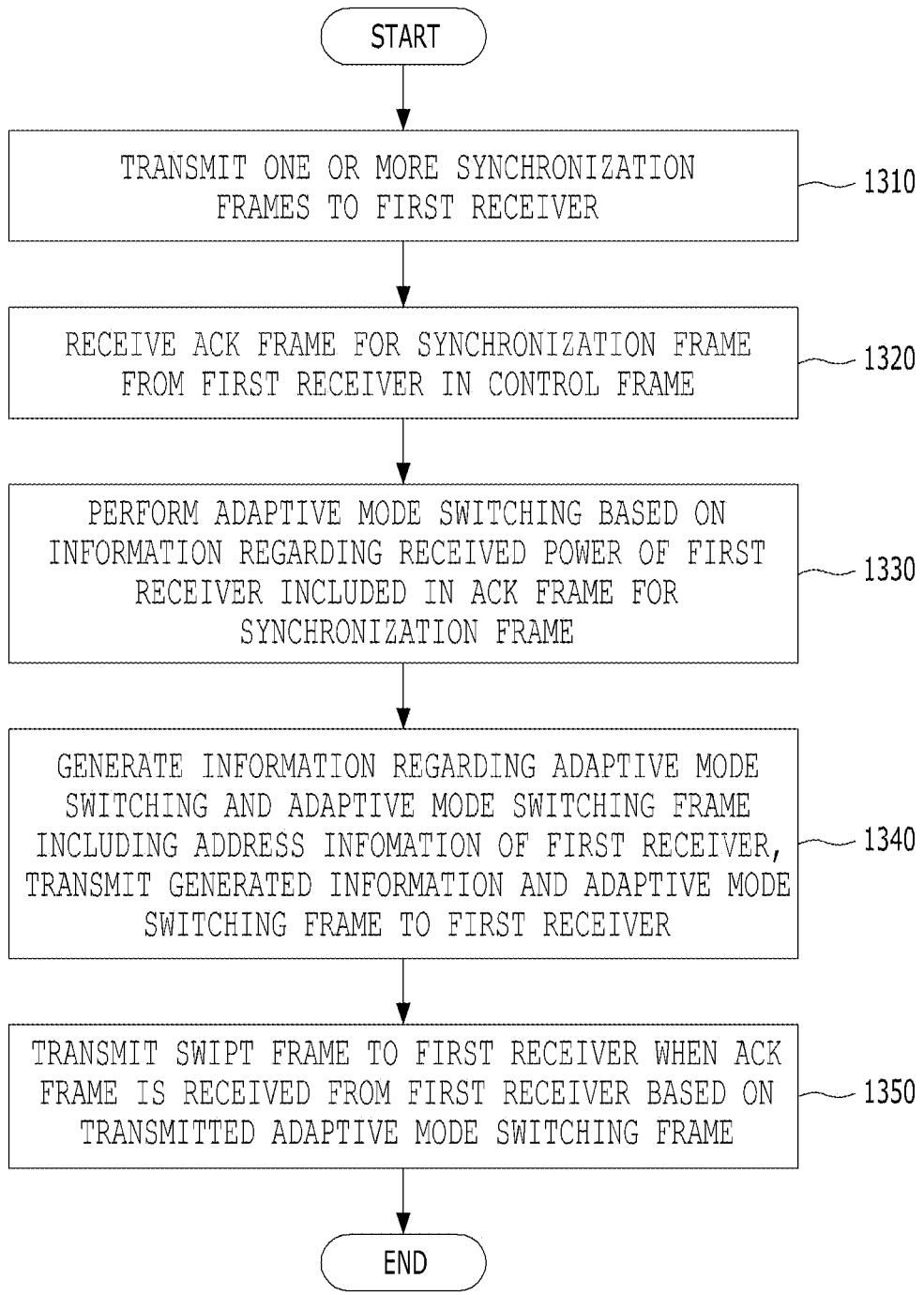
FIG. 13 is a flowchart explaining a receiver control method performed in a transmitter of a dual mode SWIPT system, according to an embodiment of the present disclosure.

FIG. 13 is a flowchart explaining a receiver control method performed in a transmitter of a dual mode SWIPT system, according to an embodiment of the present disclosure.

In Step 1310, one or more synchronization frames may be transmitted to a first receiver.

At this time, Step 1310 may be a step of transmitting one or more synchronization frames to the first receiver in a multi-tone mode.

In Step 1320, an ACK frame for the synchronization frame may be received from the first receiver in the control frame.

If the ACK frame for the synchronization frame is not received from the first receiver in the control frame, the receiver control method, according to an embodiment, may further include transmitting a frame for wireless energy transmission instead of the SWIPT frame.

In Step 1330, adaptive mode switching may be performed based on information regarding the received power of the first receiver included in the ACK frame for the synchronization frame. A mode switching method performed at this time may be a short-term adaptive mode switching method.

In Step 1340, information regarding the adaptive mode switching and an adaptive mode switching frame including address information of the first receiver may be generated and transmitted to the first receiver.

In Step 1350, when an ACK frame for the adaptive mode switching frame transmitted from the first receiver is received, a SWIPT frame may be transmitted to the first receiver.

Here, at least one of the ACK frame for the synchronization frame and the ACK frame for the adaptive mode switching frame may include information regarding the received power of the first receiver. Therefore, the transmitter may perform the adaptive mode switching based on the received power of the first receiver.

Further, Step 1350, may be a step of receiving the information regarding the received power of the first receiver from a first antenna of the transmitter when each of the transmitter and the first receiver includes a multi-antenna, and transmitting the SWIPT frame to the first receiver by using a second antenna of the transmitter.

Meanwhile, the SWIPT frame, according to an embodiment, includes an energy harvesting frame (EH frame) that is not modulated and an information transmission frame (ID frame) that is modulated, and the receiver control method, according to an embodiment, may further include receiving only the energy harvesting frame by a receiver other than the first receiver while the transmitter transmits a control frame and the SWIPT frame to the first receiver.

Further, the transmitter may control a plurality of receivers including the first receiver by using a multiple division method of at least one of a time division multiplexing (TDM) method and a dynamic-TDM (D-TDM) method.

FIG. 14 is a flowchart explaining a method of performing adaptive mode switching in a receiver of a dual mode SWIPT system, according to an embodiment of the present disclosure.

In Step 1410, synchronization may be performed based on the synchronization frame received from the transmitter and power may be harvested.

In Step 1420, it may be determined whether or not the harvested power $P_{status}$ is equal to or greater than a threshold value $P_{control}$. As the determination result, when the harvested power $P_{status}$ is equal to or greater than the threshold value $P_{control}$, Step 1430 is performed. When the harvested power $P_{status}$ is less than the threshold value $P_{status}$, Step 1410 is performed again.

In other words, in the dual mode SWIPT system, according to an embodiment, power required for the control signal needs to be supplied to the receiver in order to self-powering of the receiver. Thus, the receiver, according to an embodiment, may perform a subsequent operation when the receiver receives enough power to perform the synchronization simultaneously with wake-up.

In Step 1430, the ACK frame for the synchronization frame may be transmitted based on the determination result. The ACK frame transmitted at this time may include information regarding the received power of the receiver.

In Step 1440, when adaptive mode switching information is received from the transmitter, a reception mode may be set according to the received adaptive mode switching information.

In Step 1450, the SWIPT frame may be received from the transmitter during the duty cycle, and the ACK frame for the SWIPT frame may be transmitted. The ACK frame transmitted at this time may also include information regarding the received power of the receiver.

The transmitter 310, the dual mode SWIPT system 300, the single/multi-tone generating unit 312, the adaptive mode switching unit 313, the energy harvester 352, the single tone information receiving unit 353, the multi-tone PAPR information receiving unit 354, the backscatter information transmitter 355, the power management unit 356, and the machine learning processor in FIGS. 3-14 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing adaptive mode switching in a transmitter of a dual mode SWIPT system, the method comprising:

receiving received power $P_{r,v}$ of a receiver in a v-th channel from the receiver;

comparing the received power $P_{r,v}$ with a predetermined threshold value $P_{th}$;

selecting one of a single tone mode or a multi-tone mode as a single/multi-tone mode i based on the comparison result;

selecting a modulation index L based on the selected single/multi-tone mode i and the received power $P_{r,v}$; and transmitting the selected single/multi-tone mode i, the selected modulation index L, and a duty cycle $D_v$ to the receiver, wherein the duty cycle $D_v$ is determined based on at least one of power consumed for decoding a single tone signal, power consumed for decoding a multi-tone signal, and power harvested during the v-th channel by the receiver, and wherein the predetermined threshold value $P_{th}$ is determined after performing machine learning by using at least one of a plurality of single/multi-tone modes selected during a predetermined time, the modulation index, and the duty cycle, and the power received by the receiver during the predetermined time.

2. A receiver control method performed in a transmitter of a dual mode SWIPT system, the receiver control method comprising:
   transmitting one or more synchronization frames to a first receiver;
   receiving an ACK frame for the synchronization frame from the first receiver in a control frame;
   performing adaptive mode switching based on information regarding received power of the first receiver included in the ACK frame for the synchronization frame;
   generating information regarding the adaptive mode switching and an adaptive mode switching frame including address information of the first receiver and transmitting the generated information and adaptive mode switching frame to the first receiver; and
   transmitting a SWIPT frame to the first receiver when an ACK frame for the adaptive mode switching frame is received from the first receiver,
   wherein the ACK frame for the synchronization frame and the ACK frame for the adaptive mode switching frame include the information regarding the received power of the first receiver.

3. The receiver control method performed in a transmitter of a dual mode SWIPT system according to claim 2, wherein the SWIPT frame includes an energy harvesting frame (EH frame) that is not modulated and an information transmission frame (ID frame) that is modulated, and
   the receiver control method further comprising:
   receiving only the energy harvesting frame by a receiver other than the first receiver while the transmitter transmits the control frame and the SWIPT frame to the first receiver.

4. The receiver control method performed in a transmitter of a dual mode SWIPT system according to claim 2, wherein the transmitting of one or more synchronization frames to the first receiver is transmitting of the one or more synchronization frames to the first receiver in a multi-tone mode.

5. The receiver control method performed in a transmitter of a dual mode SWIPT system according to claim 2, wherein when the ACK frame for the synchronization frame is not received from the first receiver in the control frame, the receiver control method further comprising:
   transmitting a frame for wireless energy transmission instead of the SWIPT frame.

6. The receiver control method performed in a transmitter of a dual mode SWIPT system according to claim 2, wherein the transmitter controls a plurality of receivers including the first receiver by using a multiple division method of at least one of a time division multiplexing (TDM) method and a dynamic-TDM (D-TDM) method.

7. The receiver control method performed in a transmitter of a dual mode SWIPT system according to claim 2, wherein when each of the transmitter and the first receiver includes a multi-antenna, the transmitting of the SWIPT frame to the first receiver is receiving of the information regarding the received power of the first receiver from a first antenna of the transmitter and transmitting of the SWIPT frame to the first receiver by using a second antenna of the transmitter.

8. A transmitter of a dual mode SWIPT system performing adaptive mode switching, the transmitter comprising:
   a single/multi-tone generating unit that generates at least one of a single tone and a multi-tone to transmit at least one of the single tone and the multi-tone to a receiver; and
   an adaptive mode switching unit that extracts information regarding received power of the receiver based on a backscatter signal received from the receiver, determines at least one of a single/multi-tone mode, a modulation index, and a duty cycle based on the extracted information regarding the received power, and outputs the determination result to the receiver for transmission.

9. The transmitter of a dual mode SWIPT system performing adaptive mode switching according to claim 8, further comprising:
   a machine learning unit that performs machine learning by using at least one of a plurality of single/multi-tone modes selected during a predetermined time, the modulation index, and the duty cycle, and the power received by the receiver during the predetermined time, and generates a predetermined threshold value which is the basis of determination on the single/multi-tone mode.

10. A method of performing adaptive mode switching in a receiver of a dual mode SWIPT system, the method comprising:
    performing synchronization based on a synchronization frame received from a transmitter and harvesting power;
    determining whether or not the harvested power is equal to or greater than a threshold value;
    transmitting an ACK frame from the synchronization frame based on the determination result;
    setting a reception mode according to a received adaptive mode switching information when adaptive mode switching information is received from the transmitter; and
    receiving a SWIPT frame from the transmitter during a duty cycle and transmitting an ACK frame for the SWIPT frame.

11. A receiver of a dual mode SWIPT system performing adaptive mode switching, the receiver comprising:
    an energy harvester harvesting energy from a reception signal;
    a single tone information receiving unit extracting and decoding a predetermined modulation signal from the reception signal;
    a multi-tone peak-to-average power ratio (PAPR) information receiving unit extracting and decoding a predetermined PAPR signal from the reception signal;
    a power management unit monitoring information regarding received power of the receiver and performing adaptive mode switching based on at least one of a single/multi-tone mode received from a transmitter, a modulation index, and a duty cycle; and
    a backscatter signal transmitter outputting monitoring information to the transmitter for transmission.

12. The receiver of a dual mode SWIPT system performing adaptive mode switching according to claim 11, wherein the monitoring information is used for machine learning in the transmitter, and the backscatter signal transmitter transmits information by reflecting at least one of a carrier emitter or an ambient signal.

* * * * *